(12) United States Patent
Bonin et al.

(10) Patent No.: US 12,372,339 B2
(45) Date of Patent: Jul. 29, 2025

(54) PROJECTILE ALIGNMENT AND SECUREMENT DEVICE

(71) Applicant: ULTRA ELECTRONICS FORENSIC TECHNOLOGY INC., Montreal (CA)

(72) Inventors: Simon Bonin, Montréal (CA); Valentin Dulhariu, Laval (CA); Serge Levesque, Lachine (CA); Serge Labrecque, Laval (CA); Danny Marina, Mont-Royal (CA); Louis Lamarche, Mont-Royal (CA)

(73) Assignee: ULTRA ELECTRONICS FORENSIC TECHNOLOGY INC. (CA)

( * ) Notice: Subject to any disclaimer, the term of this patent is extended or adjusted under 35 U.S.C. 154(b) by 355 days.

(21) Appl. No.: 17/595,195

(22) PCT Filed: May 15, 2020

(86) PCT No.: PCT/CA2020/050657
§ 371 (c)(1),
(2) Date: Nov. 11, 2021

(87) PCT Pub. No.: WO2020/232535
PCT Pub. Date: Nov. 26, 2020

(65) Prior Publication Data
US 2022/0214151 A1    Jul. 7, 2022

Related U.S. Application Data (60) Provisional application No. 62/849,517, filed on May 17, 2019.

(51) Int. Cl.
*F42B 35/00*  (2006.01)
*G01N 21/88*  (2006.01)
*G01N 21/952* (2006.01)

(52) U.S. Cl.
CPC .......... *F42B 35/00* (2013.01); *G01N 21/8803* (2013.01); *G01N 21/952* (2013.01)

(58) Field of Classification Search
CPC ...................................................... F42B 35/00
(Continued)

(56) References Cited

U.S. PATENT DOCUMENTS 3,196,547 A * 7/1965 Welch ............... B23Q 17/22
33/639
4,455,757 A * 6/1984 Schwartz ............ G01B 5/25
164/154.2
(Continued)

FOREIGN PATENT DOCUMENTS

| | | |
|---|---|---|
| CA | 2164369 A1 | 6/1997 |
| CN | 109373831 A | 2/2019 |
| JP | 2004233195 A | 8/2004 |

OTHER PUBLICATIONS

European Search Report issued in counterpart EP application No. 20810337.4 on Jan. 11, 2023.

*Primary Examiner* — George B Bennett (57) ABSTRACT

The present disclosure provides devices, systems, and methods for aligning and securing a projectile. A base defining a receptacle for receiving the projectile comprises a self-centering mechanism for aligning a longitudinal axis of the projectile with a reference axis. An upstanding support projects upwardly from the base. A head member extends from the upstanding support, disposed vertically above the base, and has defined therein an opening aligned with the reference axis. A rod member is slidably mounted in the opening, such that a longitudinal axis of the rod member is aligned with the reference axis. A mounting adapter has a first end configured for adhesively retaining the projectile and a second end defining a coupling mechanism selectively mateable with a distal end of the rod member and with an (Continued)

inspection device used for performing inspection of the projectile.

20 Claims, 6 Drawing Sheets

(58) Field of Classification Search
USPC .............................. 33/1 BB, 286, 520, 533
See application file for complete search history.

(56) References Cited

U.S. PATENT DOCUMENTS

| | | | |
|---|---|---|---|
| 4,911,137 A * | 3/1990 | Troncoso | F41B 5/14 33/506 |
| 5,361,505 A * | 11/1994 | Faughn | G01B 5/18 33/506 |
| 6,018,394 A | 1/2000 | Baldur | |
| 6,354,014 B1 * | 3/2002 | Yamakawa | G01B 3/18 33/813 |
| 6,813,843 B1 * | 11/2004 | Faubion | B23Q 17/2233 33/534 |
| 8,004,694 B2 | 8/2011 | Lee et al. | |
| 8,550,444 B2 | 10/2013 | Nygaard et al. | |
| 2015/0204798 A1 | 7/2015 | Nygaard et al. | |
| 2018/0340895 A1 | 11/2018 | Jeanne et al. | |

\* cited by examiner

PROJECTILE ALIGNMENT AND SECUREMENT DEVICE

CROSS-REFERENCE TO RELATED APPLICATIONS

This application is a U.S. National Stage application under 35 U.S.C. § 371 of International Application PCT/CA2020/050657 (published as WO2020/232535 A1), filed May 15, 2020, which claims priority to U.S. Provisional Patent Application No. 62/849,517, filed May 17, 2019, and the present application claims priority to and the benefit of both of these prior applications, each of which is incorporated by reference in its entirety.

TECHNICAL FIELD

The present disclosure relates to projectile inspection, and more specifically to devices for preparing projectiles for inspection.

BACKGROUND OF THE ART

Ballistic comparison tests rely on the striations and impressions that are created on the surface of a projectile, such as a bullet or cartridge case. These striations have unique features that represent a unique signature of a firearm. By comparing the striations or impressed characteristics of two projectiles, it may be possible to conclude if they have been fired from the same firearm.

When performing projectile analysis, various visual inspection tools can be used to investigate the surface of the projectile. These analyses are often automated: a projectile is provided to an inspection tool which can then image or otherwise inspect the projectile to assess different characteristic thereof. However, comparison of different projectiles can be difficult if the methodology for retaining the projectile for investigation by the analysis device is not standardized.

Therefore, there is room for improvement.

SUMMARY

In accordance with a broad aspect, there is provided a device for aligning and securing a projectile. A base defining a receptacle for receiving the projectile comprises a self-centering mechanism for aligning a longitudinal axis of the projectile with a reference axis. An upstanding support projects upwardly from the base. A head member extends from the upstanding support, disposed vertically above the base, and has defined therein an opening aligned with the reference axis. A rod member is slidably mounted in the opening, such that a longitudinal axis of the rod member is aligned with the reference axis. A mounting adapter has a first end configured for adhesively retaining the projectile and a second end defining a coupling mechanism selectively mateable with a distal end of the rod member and with an inspection device used for performing inspection of the projectile.

In at least some embodiments, the self-centering mechanism comprises: a plurality of spring-loaded fingers coupled to the base at respective proximal ends thereof and each having disposed at respective distal ends thereof a projectile-retaining member; and a retracting mechanism coupled to the plurality of spring-loaded fingers for retracting the spring-loaded fingers from a centre of the receptacle.

In at least some embodiments, the self-centering mechanism substantially encircles the receptacle defined by the base.

In at least some embodiments, the projectile-retaining members are rotatable.

In at least some embodiments, the base defines a slope tapering toward the centre of the receptacle.

In at least some embodiments, the device further comprises an alignment plate coupled to the upstanding support, the alignment plate having disposed thereon a visual reference for validating an alignment of the projectile within the mounting adapter.

In at least some embodiments, the visual reference comprises a plurality of spaced parallel lines along a length of the alignment plate.

In at least some embodiments, the rod member has defined therein one or more notches, and wherein the head member comprises a retention mechanism for securing the rod member at one or more predetermined heights via the one or more notches.

In at least some embodiments, the rod member is rotatably retained within the opening.

In at least some embodiments, the mounting adapter comprises an adhesive applied to the first end thereof.

In at least some embodiments, the adhesive is a wax-based adhesive.

In at least some embodiments, the adhesive is a glue.

In at least some embodiments, the mounting adapter is removably mountable to the rod member via the coupling mechanism.

In accordance with another broad aspect, there is provided a method for facilitating the positioning of projectiles for use with an inspection tool, comprising: placing a projectile in a receptacle; aligning the projectile with a reference axis; coupling a mounting adapter to a rod member via a coupling mechanism, the mounting adapter being couplable via the coupling mechanism to the inspection tool; retaining the projectile in the mounting adapter; and decoupling the mounting adapter from the rod member.

In at least some embodiments, aligning the projectile with a reference axis comprises actuating a retracting mechanism to move a plurality of spring-loaded fingers which displaces the projectile to be aligned with the reference axis.

In at least some embodiments, retaining the projectile in the mounting adapter comprises applying an adhesive to one of the projectile and the mounting adapter.

In at least some embodiments, the method further comprises, following retaining the projectile in the mounting adapter, inspecting the projectile against an alignment plate.

In at least some embodiments, inspecting the projectile against the alignment plate comprises rotating the rod member.

In at least some embodiments, decoupling the mounting adapter from the rod member comprises retaining the rod member via one of a plurality of notched formed therein using a retention mechanism.

In at least some embodiments, the method further comprises coupling the mounting adapter to the inspection tool after the projectile is retained in the mounting adapter.

Features of the systems, devices, and methods described herein may be used in various combinations, in accordance with the embodiments described herein.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Visual inspection tools used for projectile analysis can include a variety of cameras, scanners, lighting sources, and other optical tools for accurately assessing the topography of a projectile under inspection. When inspection tools are automated, the reliability and repeatability of projectile positioning mechanisms impacts the speed and accuracy of inspection results. The present discloses devices, systems, and methods for facilitating the positioning of projectiles for use in inspection tools.

Figure 1:
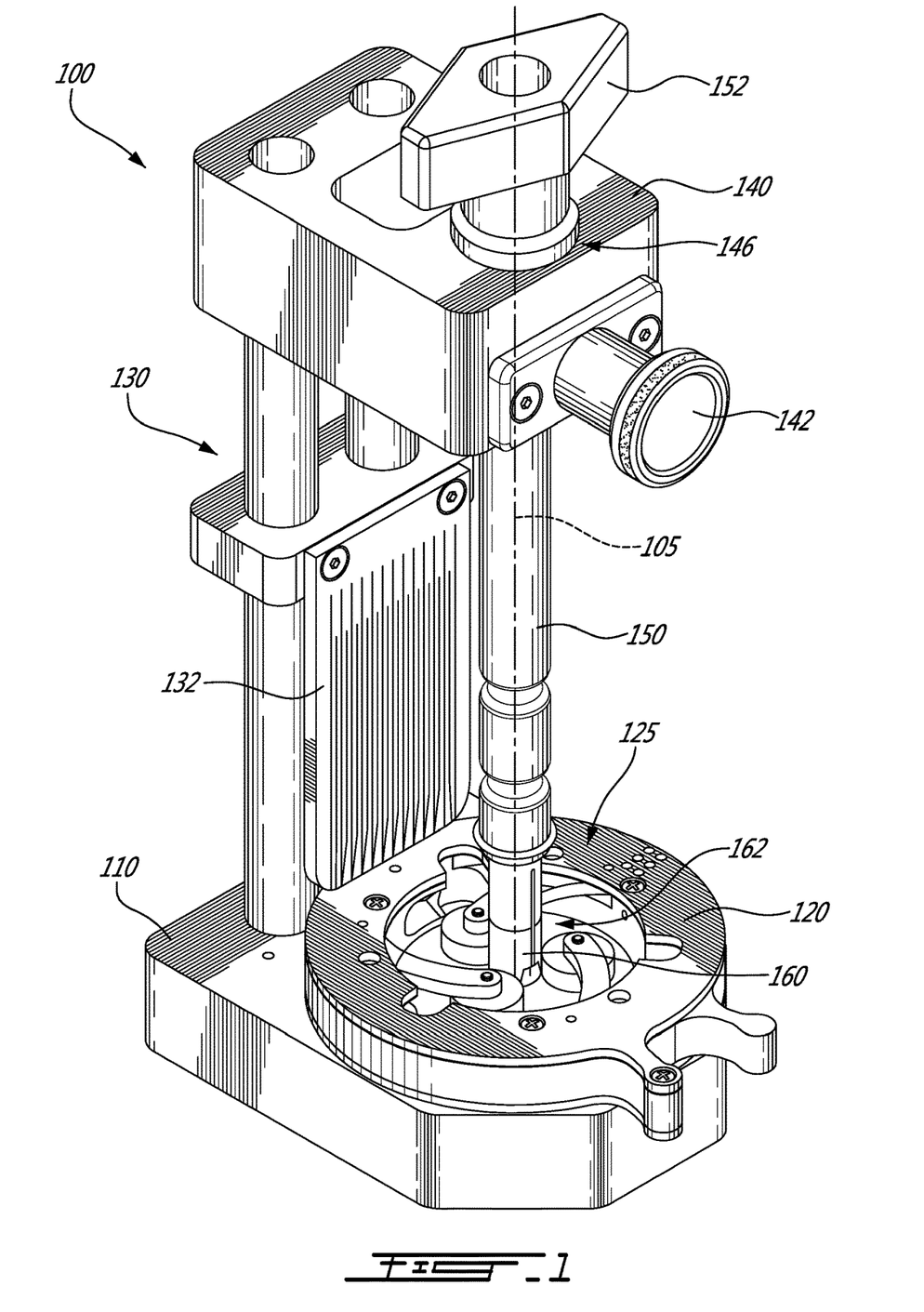
FIG. 1 illustrates a perspective view of an example projectile alignment and securement (PAS) device, in accordance with at least some embodiments.

With reference to FIG. 1, a projectile alignment and securement (PAS) device 100 is illustrated. The PAS device 100 is composed of a base 110, a self-centering mechanism 120, an upstanding support 130, a head member 140, a rod member 150, and a mounting adapter 160. The PAS device 100 can be used to align a projectile with the mounting adapter 160, and then the projectile therein, for instance via a glue or other adhesive. Once the projectile is retained within the mounting adapter 160, the mounting adapter 160 can be removed from the PAS device 100 and be coupled to an inspection tool to allow for inspection of the projectile in any suitable fashion. The mounting adapter 160 can be coupled to the PAS device 100 and to the inspection device via a common coupling mechanism, which provides for repeatable positioning of the projectile within the inspection device after having been retained within the mounting adapter 160.

The base 110 has disposed thereon the self-centering mechanism 120, and defines a receptacle 125 which is substantially surrounded by the self-centering mechanism 120. A projectile for inspection can be placed into the receptacle 125, and by operation of the self-centering mechanism 120, caused to be aligned with a reference axis, illustrated at dashed line 105. As used herein, the projectile is said to be aligned with the reference axis 105 when a longitudinal axis of the projectile is substantially aligned with the reference axis 105.

Coupled to the base 110 is the upstanding support 130. The upstanding support 130 is coupled at a first end thereof to the base 110, and at a second end thereof to the head member 140. The upstanding support 130 can be any suitable type of support, and can take on any suitable shape and size. In some embodiments, the upstanding support 130 is composed of two or more tubular members and a transverse connector. Other embodiments are also considered. The upstanding support 130 can have coupled thereto an alignment plate 132, described in greater detail hereinbelow.

The head member 140 is coupled to the upstanding support 130 opposite the base 110, such that the head member 140 is elevated vis-à-vis the base 110. The head member 140 has defined therein an opening 146, through which the rod member 150 is insertable. The opening 146 can be sized for accommodating the rod member 150, which can be slidably and rotatably movable through the opening 146. In some embodiments, the head member 140 includes a retention mechanism which can be used to retain the rod member 150 at one or more predetermined positions. The retention mechanism can be actuated by a knob 142 or other device.

The rod member 150 is movably retained within the head member 140 for moving along the aforementioned reference axis 105. The rod member 150 includes a handle 152 or other gripping element which is coupled at a proximal end of the rod member 150. The distal end of the rod member 150 is formed for mating with a coupling mechanism 162 of the mounting adapter 160, by which the mounting adapter 160 can be coupled to the rod member 150.

The mounting adapter 160 serves to retain the projectile placed in the receptacle 125 when brought into contact with the projectile. For example, the mounting adapter 160 defines an outer wall surrounding an opening for receiving at least part of the projectile therein. The projectile is then retained via friction and/or via an adhesive substance disposed within the opening. The mounting adapter 160 can be coupled to the rod member 150 via the coupling mechanism 162. The coupling mechanism 162 can also be used to couple the mounting adapter 160 to an inspection tool or other device which is used to perform inspection of the projectile. That is to say, after the projectile is retained within the mounting adapter 160, the mounting adapter 160 can be removed from the rod member 150 and coupled to the inspection tool to allow for inspection of the projectile. In some embodiments, the adhesive substance is a wax-based adhesive, a glue, or a similar substance, although other substances are also considered. For instance, the adhesive substance can be selected based on a softness of the material, which can assist in reducing the transfer of marks to the projectile by the mounting adapter 160, or by other elements of the PAS device 100.

In one example of operation, a projectile is placed within receptacle 125. The self-centering mechanism 120 is used to align the projectile so that a longitudinal axis of the projectile is aligned with reference axis 105. The rod member 150 is inserted in the opening 146 of the head member 140, which causes the rod member 150 to be aligned with reference axis 105. Once the projectile and the rod member 150 are aligned, the rod member 150 can be positioned such that at least part of the projectile is retained within the mounting adapter 160. The rod member 150 can then be displaced to allow an operator to remove, from the distal end of rod member 150, the mounting adapter 160 which retains the projectile.

Because the mounting adapter 160 can be coupled to both the rod member 150 and to the inspection tool that will be used to perform inspection of the projectile, the alignment of the projectile within the mounting adapter 160 can be substantially maintained from the PAS device 100 to the inspection tool. Put differently, once the PAS device 100 aligns the projectile within the mounting adapter 160, that alignment is substantially maintained once the mounting adapter 160 is coupled to the inspection tool. This can assist in increasing reliability when performing inspection of projectiles.

Figure 2:
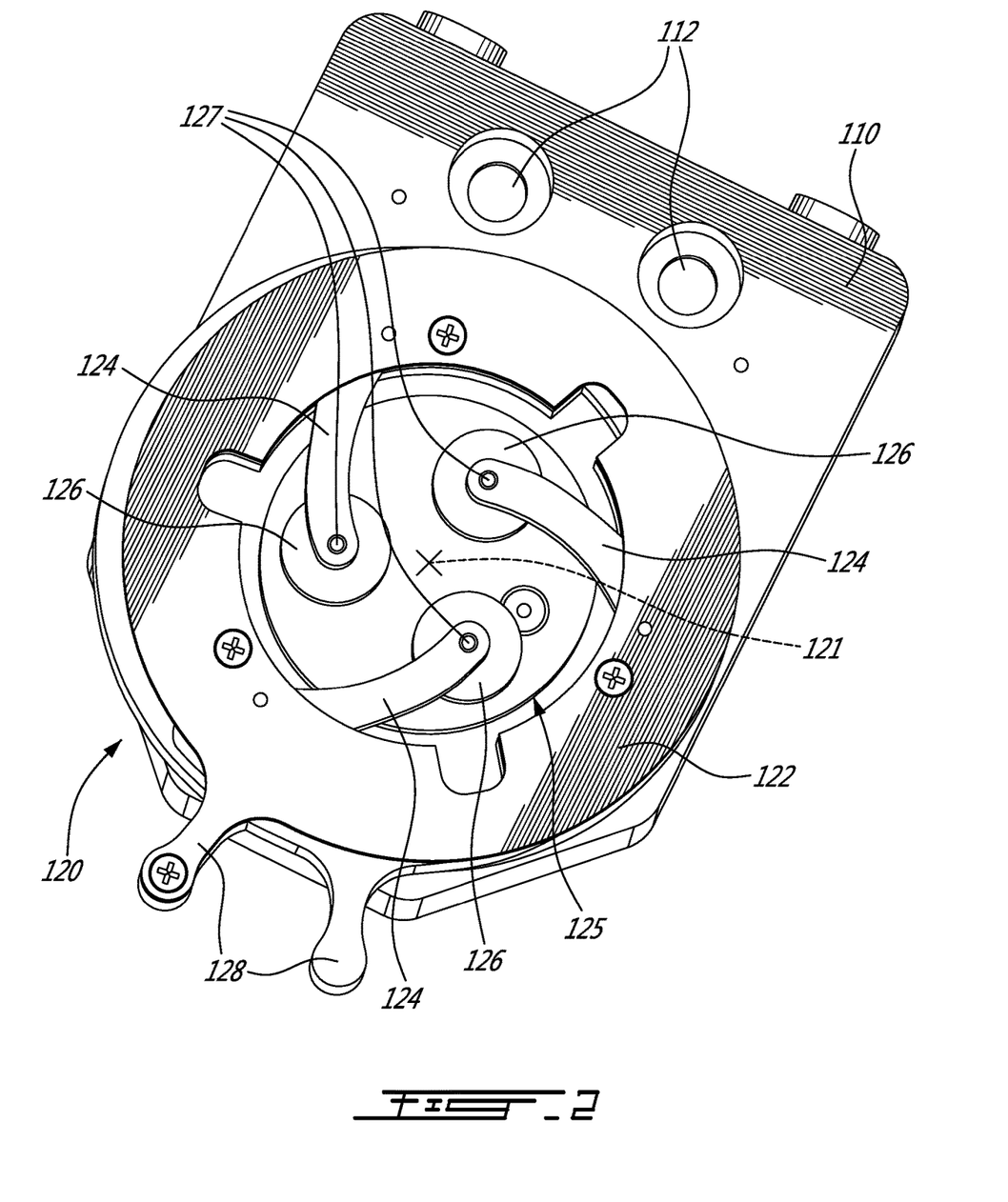
FIG. 2 illustrates a top view of an example base of the PAS device of FIG. 1, in accordance with at least some embodiments.

With reference to FIG. 2, the base 110 supports the self-centering mechanism 120. The self-centering mechanism 120 can be disposed on the base 110 in any suitable fashion, and can be affixed thereto using any suitable means. For instance, the self-centering mechanism 120 can be affixed to the base using one or more screws. The base 110 and the self-centering mechanism 120 define a receptacle 125, in which projectiles can be disposed. The self-centering mechanism 120 is then operative to cause the projectile to be aligned with the reference axis 105.

In some embodiments, the self-centering device 120 is composed of a plurality of spring-loaded fingers 124 coupled to a frame 122 of the self-centering device 120 at respective proximal ends thereof. Disposed at respective distal ends of the fingers 124 are projectile-retaining members 126. The fingers 124 can be retracted from a 121 centre of the receptacle 125 (at the intersection of the reference axis 105 and the receptacle 125) by action of a retracting mechanism 128. When the retracting mechanism 128 is released, the fingers 124 extend such that the projectile-retaining members 126 are proximate the centre 121 of the receptacle 125. In this fashion, the projectile-retaining members 126 can retain a projectile placed in the receptacle 125 at the centre 121 of the receptacle 125. Although FIG. 2 illustrates an embodiment of the self-centering mechanism 120 having three (3) spring-loaded fingers 124, it should be understood that other embodiments can have any suitable number of spring loaded fingers 124.

In some embodiments, the sizing of the projectile-retaining members 126 can be selected based on the size of the projectiles in use. For example, larger projectile-retaining members 126 can be used with smaller projectiles, and smaller projectile-retaining members 126 can be used with larger projectiles. In some other embodiments, the projectile-retaining members 126 can be composed of a soft and/or deformable material which compresses when retaining the projectile at the centre 121 of the receptacle 125, for instance to avoid damaging the projectile when displacing the projectile within the receptacle 125. The projectile-retaining members 126 can assume any shape or form suitable for retaining the projectile at the centre 121 of the receptacle 125.

In some embodiments, the projectile-retaining members 126 are rotatable about respective axes 127 on spring-loaded fingers 124. For example, when the rod member 150 is displaced to retain the projectile within the mounting adapter 160, the rod member 150 may also be rotated to assist in retaining the projectile within the mounting adapter 160. In order to avoid damaging the projectile, the projectile-retaining members 126 can be rotatable about axes 127 so that the projectile-retaining members 126 rotate along with any rotation of the projectile.

It should be noted that other embodiments of the self-centering device 120 are also considered. For example, the self-centering device 120 can include a sloped receptacle 125 and recess located at the centre 121 of the receptacle 125 for receiving the projectile. In some instances, differently-sized recesses can be provided for differently-sized projectiles.

The base 110 also couples to the upstanding support 130. In some embodiments, the base 110 defines one or more openings 112 in which the upstanding support 130 can be inserted for retention within the base 110. The openings 112 can be of any suitable shape, size, and number. In some embodiments, the upstanding support 130 can be coupled to the base 110 using additional elements, including screws, snap-fits, magnets, and the like.

Figure 3:
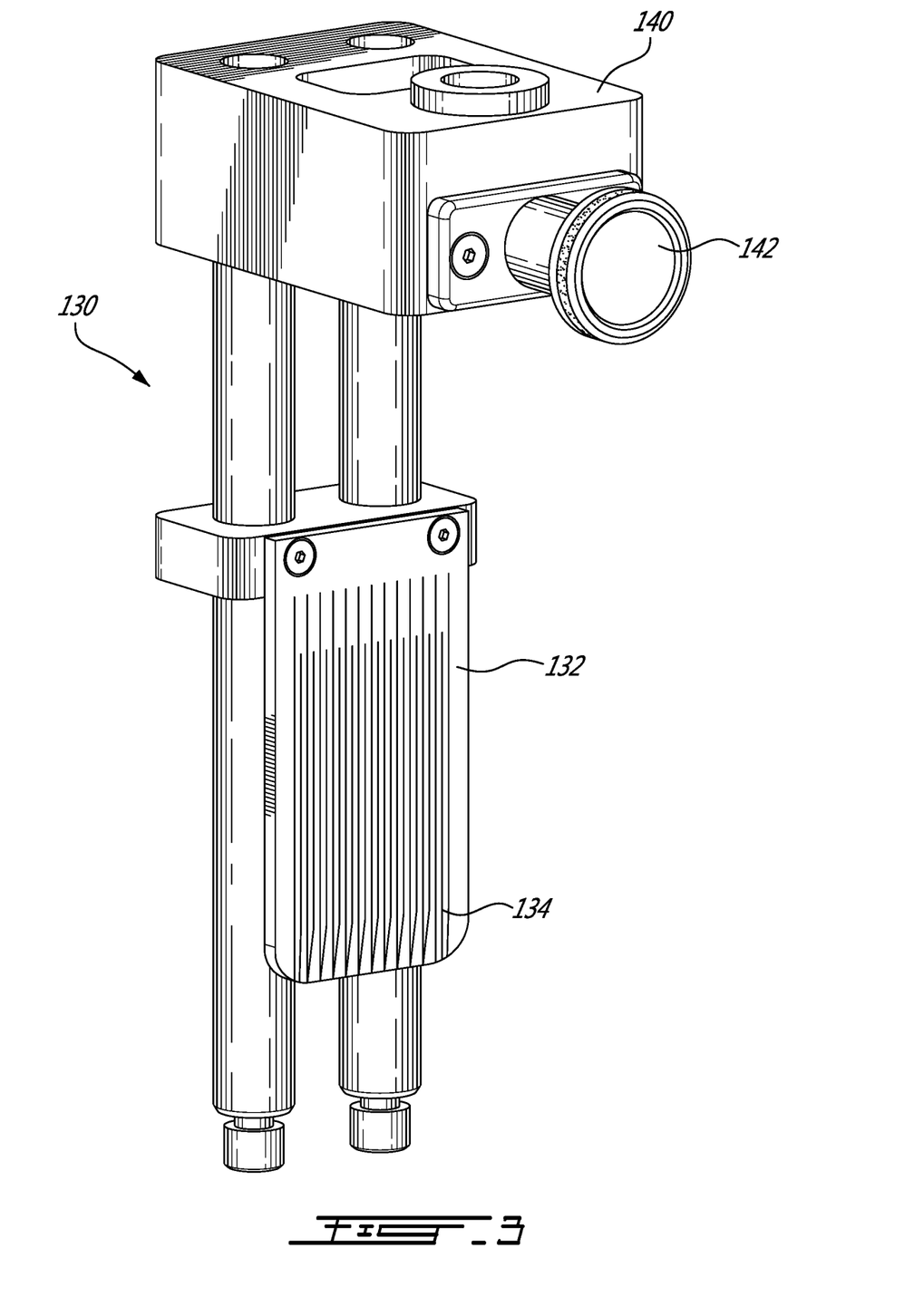
FIG. 3 illustrates a perspective view of an example upstanding support and head member of the PAS device of FIG. 1, in accordance with at least some embodiments.

With reference to FIG. 3, the upstanding support 130 and the head member 140 are illustrated. In some embodiments, the alignment plate 132 is coupled to the upstanding support 130. The alignment plate 132 has defined on a face thereof a visual reference which can be used by an operator of the PAS device 100 to determine whether the alignment of the projectile within the mounting adapter 160 is satisfactory. For example, the visual reference can be a plurality of spaced parallel lines 134. The alignment plate 132 can be affixed to the upstanding support 130 in any suitable fashion. In some other embodiments, the alignment plate 132 can alternatively, or additionally, be affixed to the base 110, the self-centering mechanism 120, and/or the head member 140.

Figure 4:
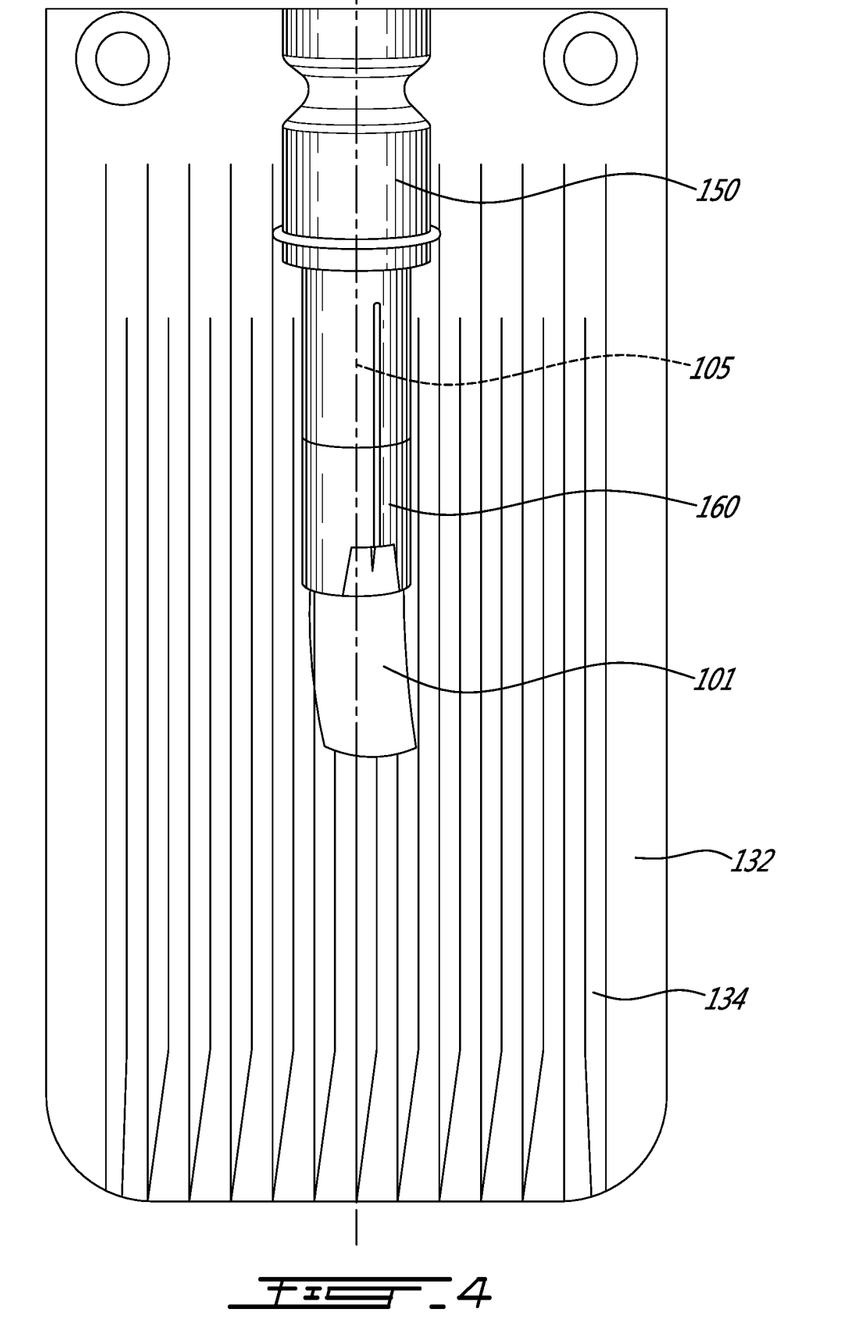
FIG. 4 illustrates a front view of an example alignment plate of the PAS device of FIG. 1, in accordance with at least some embodiments.

With additional reference to FIG. 4, when a projectile 101 is retained within the mounting adapter 160, an operator of the PAS device 100 can raise the rod member 150 to a height at which, when viewed from a front perspective, the alignment plate 132 is visible behind the projectile 101. The lines 134 of the alignment plate 132 can then be used to determine whether the projectile 101 is appropriately positioned within the mounting adapter 160.

For example, by rotating the rod member 150, the positioning of the projectile 101 may vary the visibility of some of the lines 134, depending on the alignment of the projectile 101. The lines 134 are substantially parallel to the reference axis 105. If the projectile 101 is aligned with the lines 134, and thus with the reference axis 105, rotation of the projectile 101 will not vary which of the lines 134 are visible to the operator. In contrast, if the projectile 101 is not aligned with the reference axis 105, rotation of the projectile 101 will change which of the lines 134 are visible as the projectile 101 rotates. Other approaches for validating the alignment of the projectile 101 within the mounting adapter 160 are also considered.

Figure 5:
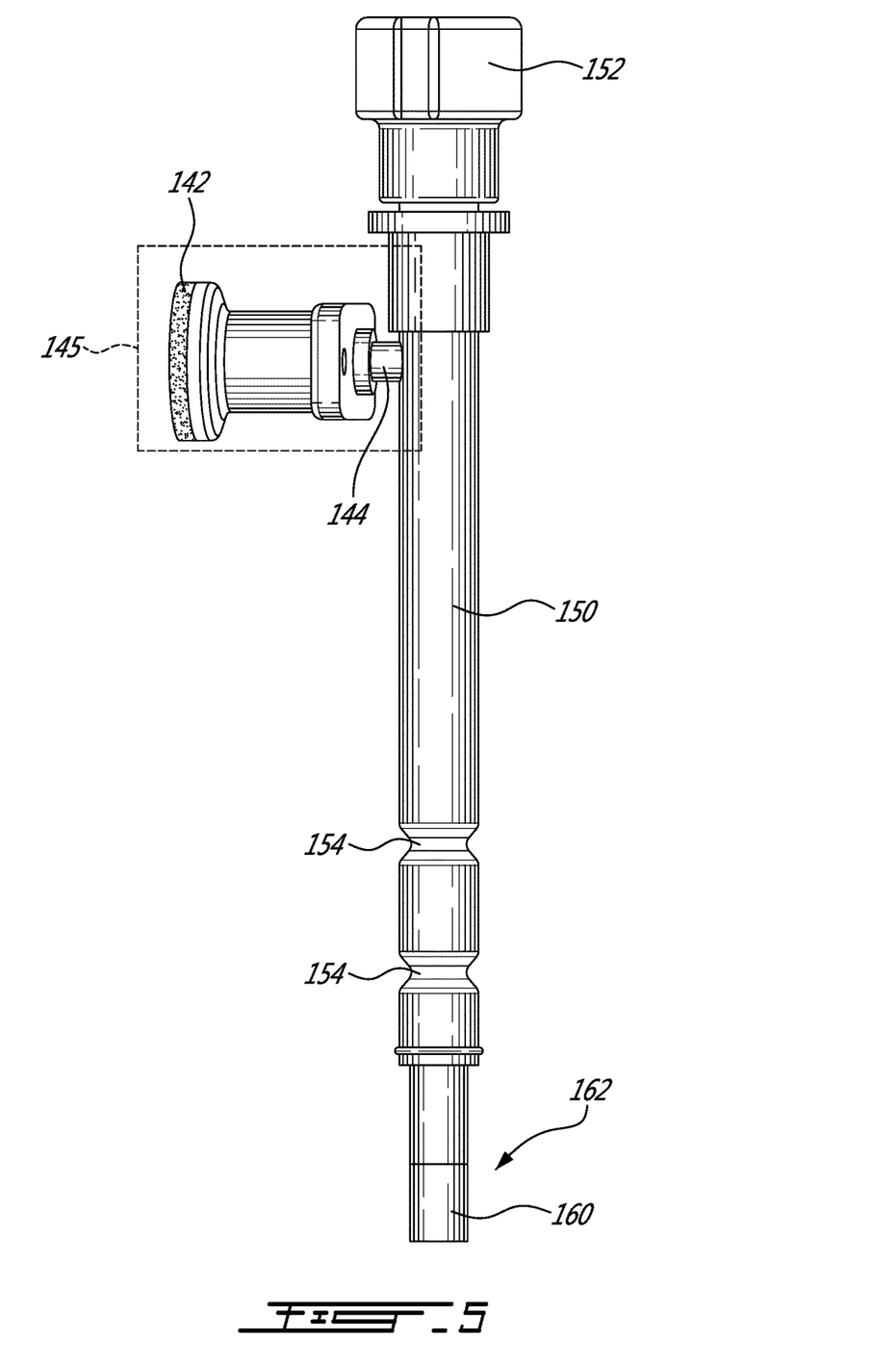
FIG. 5 illustrates a side view of an example rod retention mechanism of the PAS device of FIG. 1, in accordance with at least some embodiments.

With reference to FIG. 5, the rod member 150 has defined therein one or more notches 154. The notches 154 can cooperate with a retention mechanism 145 of the head member 140 to lock or otherwise retain the rod member 150 at one or more predetermined heights. In some embodiments, the retention mechanism 145 is composed of the knob 142 and a projection 144 coupled thereto. The knob 142 and the projection 144 can be displaced, for example when an operator pulls on the knob 142. The projection 144 can be partially or substantially completely inserted into one of the notches 154, thereby retaining the rod member 150. For example, a notch 154 can be provided at a predetermined location on the rod member 150 so that, when the rod member is retained by the particular notch, the alignment plate 132 is visible behind the mounting adapter 160 and/or the projectile 101. Other notches 154 can be provided at other locations, for instance at height suitable for retaining the projectile 101 within the mounting adapter 160, or at a height suitable for coupling/decoupling the mounting adapter from the rod member 150.

It should be noted that, throughout the present discussion, references to an "operator" includes cases of robotized operators, equipped with suitable machine vision systems and motor functions for operating the PAS device 100. For instance, a robotized operator can perform visual inspection of the projectile 101 against the alignment plate 132 using a machine vision system.

Figure 6:
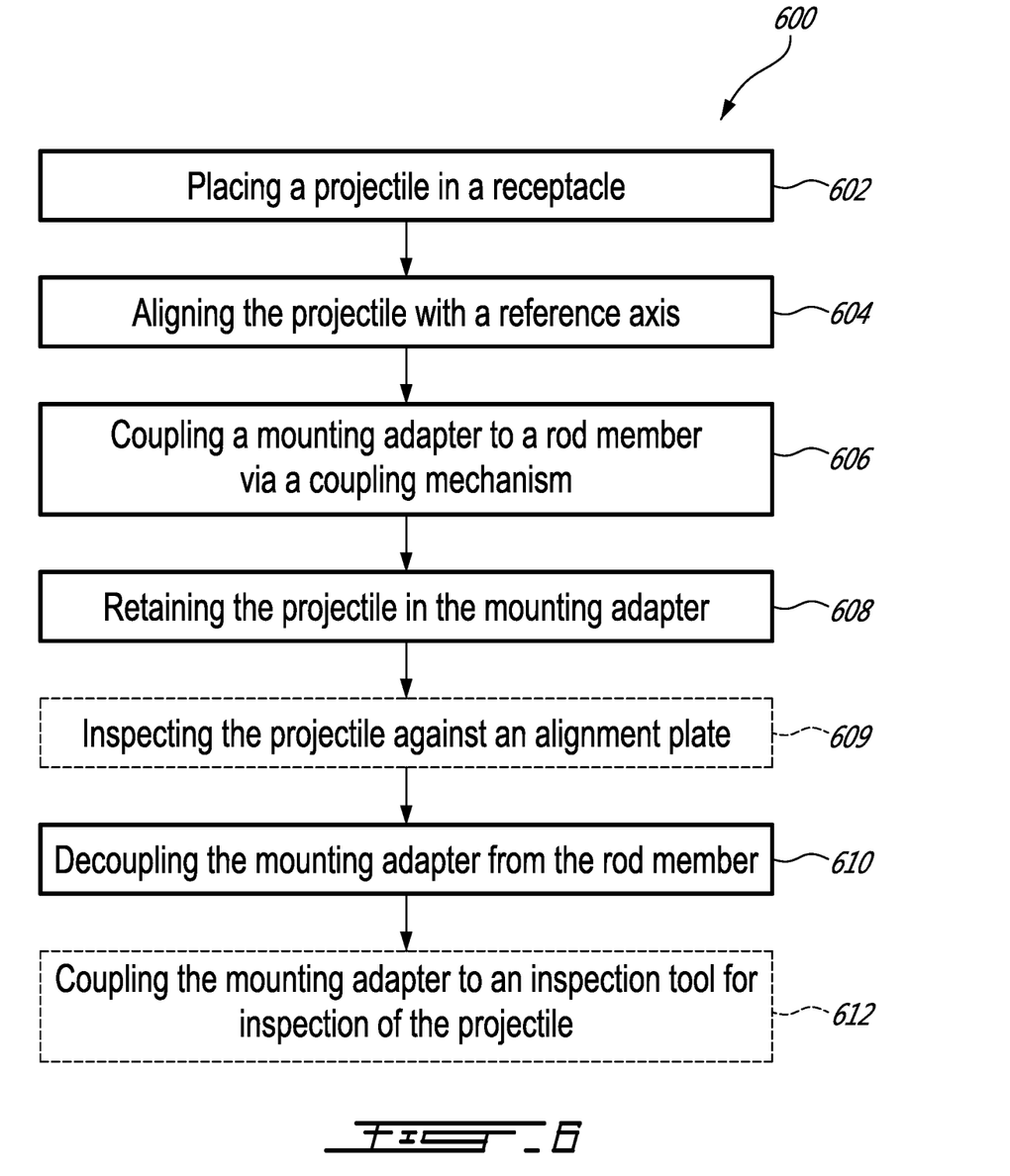
FIG. 6 illustrates an example method for facilitating the positioning of projectiles for use with an inspection tool, in accordance with at least some embodiments.

With reference to FIG. 6, there is shown a flowchart illustrating a method 600 for aligning and securing a projectile, for instance the projectile 101. At step 602, the projectile 101 is placed in a receptacle, for instance the receptacle 125. At step 604, the projectile 101 is aligned with a reference axis, for instance the reference axis 105. The projectile 101 can be aligned with the reference axis 105 using a self-centering mechanism, for example the self-centering mechanism 120.

At step 606, a mounting adapter is coupled to a rod member via a coupling mechanism, for instance the mounting adapter 160 which couples to the rod member 150 via the coupling mechanism 162. The coupling mechanism 162 can be provided for coupling the mounting adapter 160 to the rod member 150 and to an inspection tool or other device which is used to perform inspection of the projectile 101.

At step 608, the projectile 101 is retained in a mounting adapter, for instance the mounting adapter 160. The mounting adapter is coupled to a rod member, for instance the rod member 150, and the rod member 150 can be moved to cause the mounting adapter 160 to be brought into contact with the projectile 101 for retaining the projectile 101. In some embodiments, the mounting adapter 160 is provided with an adhesive or similar substance for retaining the mounting adapter 160.

At step 609, optionally the projectile 101 is inspected against an alignment plate, for instance the alignment plate 132. The inspection process can include comparing an alignment of the projectile 101 to one or more reference disposed on the alignment plate 132, for the instance spaced parallel lines 134. The inspection process can also include rotating the projectile 101 by rotating the rod member 150. Other types of inspection can also be performed, for instance confirming that the projectile 101 is properly retained within the mounting adapter 160, or confirming that the adhesive has not damaged or dirtied the projectile 101.

At step 610, the mounting adapter 160 can be decoupled from the rod member, for instance via the coupling mechanism 162. Optionally, at step 612, the mounting adapter 160 can then be coupled to the inspection tool via the coupling mechanism 162, for instance to perform inspection of the projectile 101. The inspection tool can be any suitable type of inspection tool configured for receiving the mounting adapter 160 used for retaining the projectile 101.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the devices, systems, and methods for facilitating the positioning of projectiles for use in inspection tools described may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A device for aligning and securing a projectile, comprising:
   a base defining a receptacle for receiving the projectile and comprising a self-centering mechanism for aligning a longitudinal axis of the projectile with a reference axis;
   an upstanding support projecting upwardly from the base;
   a head member extending from the upstanding support, disposed vertically above the base, and having defined therein an opening aligned with the reference axis;
   a rod member slidably mounted in the opening, such that a longitudinal axis of the rod member is aligned with the reference axis; and
   a mounting adapter having a first end configured for adhesively retaining the projectile and a second end defining a coupling mechanism selectively mateable with a distal end of the rod member and with an inspection device used for performing inspection of the projectile.

2. The device of claim 1, wherein the self-centering mechanism comprises
   a plurality of spring-loaded fingers coupled to the base at respective proximal ends thereof and each having disposed at respective distal ends thereof a projectile-retaining member; and
   a retracting mechanism coupled to the plurality of spring-loaded fingers for retracting the spring-loaded fingers from a centre of the receptacle.

3. The device of claim 2, wherein the self-centering mechanism substantially encircles the receptacle defined by the base.

4. The device of claim 2, wherein the projectile-retaining members are rotatable.

5. The device of claim 2, wherein the base defines a slope tapering toward the centre of the receptacle.

6. The device of claim 1, further comprising an alignment plate coupled to the upstanding support, the alignment plate having disposed thereon a visual reference for validating an alignment of the projectile within the mounting adapter.

7. The device of claim 5, wherein the visual reference comprises a plurality of spaced parallel lines along a length of the alignment plate.

8. The device of claim 1, wherein the rod member has defined therein one or more notches, and wherein the head member comprises a retention mechanism for securing the rod member at one or more predetermined heights via the one or more notches.

9. The device of claim 1, wherein the rod member is rotatably retained within the opening.

10. The device of claim 1, wherein the mounting adapter comprises an adhesive applied to the first end thereof.

11. The device of claim 10, wherein the adhesive is a wax-based adhesive.

12. The device of claim 10, wherein the adhesive is a glue.

13. The device of claim 1, wherein the mounting adapter is removably mountable to the rod member via the coupling mechanism.

14. A method for facilitating the positioning of projectiles for use with an inspection tool, comprising:
   placing a projectile in a receptacle;
   aligning the projectile with a reference axis;
   coupling a mounting adapter to a rod member via a coupling mechanism, the mounting adapter being couplable via the coupling mechanism to the inspection tool;
   retaining the projectile in the mounting adapter; and
   decoupling the mounting adapter from the rod member.

15. The method of claim 14, wherein aligning the projectile with a reference axis comprises actuating a retracting mechanism to move a plurality of spring-loaded fingers which displaces the projectile to be aligned with the reference axis.

16. The method of claim 14, wherein retaining the projectile in the mounting adapter comprises applying an adhesive to one of the projectile and the mounting adapter.

17. The method of claim 14, further comprising, following retaining the projectile in the mounting adapter, inspecting the projectile against an alignment plate.

18. The method of claim 17, wherein inspecting the projectile against the alignment plate comprises rotating the rod member.

19. The method of claim 14, wherein decoupling the mounting adapter from the rod member comprises retaining the rod member via one of a plurality of notched formed therein using a retention mechanism.

20. The method of claim 14, further comprising coupling the mounting adapter to the inspection tool after the projectile is retained in the mounting adapter.

\* \* \* \* \*